(12) United States Patent
Koponen et al.

(10) Patent No.: US 8,501,263 B2
(45) Date of Patent: Aug. 6, 2013

(54) BEVERAGE AND A METHOD FOR PREPARATION THEREOF

(75) Inventors: Leena Koponen, Turku (FI); Ritva Lahtinen, Turku (FI); Ingmar Wester, Turku (FI)

(73) Assignee: Raisio Nutrition Ltd., Raisio (FI)

( * ) Notice: Subject to any disclaimer, the term of this patent is extended or adjusted under 35 U.S.C. 154(b) by 494 days.

(21) Appl. No.: 12/670,588

(22) PCT Filed: Jul. 24, 2008

(86) PCT No.: PCT/FI2008/050445
§ 371 (c)(1),
(2), (4) Date: Apr. 13, 2010

(87) PCT Pub. No.: WO2009/013395
PCT Pub. Date: Jan. 29, 2009

(65) Prior Publication Data
US 2010/0209587 A1    Aug. 19, 2010

(30) Foreign Application Priority Data
Jul. 25, 2007    (FI) ..................... 20070569

(51) Int. Cl.
*A23L 1/30*    (2006.01)
(52) U.S. Cl.
USPC ........... 426/590; 426/519; 426/520; 426/599; 426/615; 426/604; 426/648

(58) Field of Classification Search
USPC ................ 426/590, 599, 615, 519, 520, 604, 426/648
See application file for complete search history.

(56) References Cited

U.S. PATENT DOCUMENTS

| | | | |
|---|---|---|---|
| 6,113,972 A * | 9/2000 | Corliss et al. ................ | 426/613 |
| 6,576,285 B1 * | 6/2003 | Bader et al. .................... | 426/590 |
| 7,335,389 B2 * | 2/2008 | Lerchenfeld et al. ......... | 426/599 |
| 2002/0064548 A1 | 5/2002 | Yoon et al. | |
| 2005/0175672 A1 | 8/2005 | Kluetz et al. | |

FOREIGN PATENT DOCUMENTS

| | | |
|---|---|---|
| DE | 100 63 288 A1 | 7/2002 |
| WO | WO 03/105611 A2 | 12/2003 |
| WO | WO 2004/093571 A1 | 11/2004 |
| WO | WO 2007/016630 A1 | 2/2007 |

\* cited by examiner

*Primary Examiner* — Helen F Heggestad
(74) *Attorney, Agent, or Firm* — Arent Fox LLP

(57) ABSTRACT

The invention relates to a stable beverage comprising at least one texture component selected from the group consisting of unhomogenised vegetable puree, fruit pulp and fruit puree, optionally unhomogenised vegetable juice and/or fruit juice, optionally homogenised vegetable material and/or fruit material, and a plant sterol ester and/or plant stanol ester in an amount of from 0.2 to 25% by weight of the beverage. Additionally the invention relates to a method for preparing the stable beverage.

23 Claims, No Drawings

BEVERAGE AND A METHOD FOR PREPARATION THEREOF

CROSS-REFERENCE TO RELATED APPLICATION

This application is a National Stage entry of International Application No PCT/FI2008/050445, filed Jul. 24, 2008, which claims priority of FI 20070569, filed Jul. 25, 2007. The disclosure of the prior application is hereby incorporated in its entirety by reference.

FIELD OF INVENTION

The present invention relates to stable vegetable and/or fruit based beverages containing plant sterol ester and/or plant stanol ester and a method for preparing them.

BACKGROUND OF THE INVENTION

It is highly recommended to increase the vegetable and fruit consumption as they are valuable sources of vitamins and a wide variety of nutrients with known and still un-known health effects to man. Many epidemiological studies imply clear health benefits related to a higher dietary intake of fruits and vegetables. Consuming recommended daily levels of especially vegetables may be difficult due to the need of preparation, like peeling and even cooking before eating. Fruit and vegetable shots have recently become commercially available and are ready-to-drink concepts. Typically 100 ml beverage equals up to 200 g fresh weight of fruits and/or vegetables.

Plant sterol and/or plant stanol containing food products reduce the absorption of both dietary and biliary cholesterol, leading to a reduction of serum cholesterol levels, especially the serum level of so-called bad cholesterol (LDL cholesterol), while the serum levels of "good cholesterol" (HDL cholesterol) is not affected. Plant sterols and plant stanols lower serum LDL cholesterol even when used as part of a recommended diet and thus add effectively to the reduction of the risk of atherosclerosis.

One drawback with vegetable beverages is that they are not as palatable as fruit beverages. The main reasons are probably the harsh and astringent acid taste and unsatisfactory mouthfeel. Also sedimentation makes the beverage unacceptable in appearance although the sediment can be mixed with the liquid part by shaking just before use. These kinds of products are therefore packed in nontransparent packages to find consumer acceptance. Also fruit beverages have the same kind of problem concerning sedimentation.

WO 2004/093571 discloses e.g. beverages with masked bitter, sour and/or astringent taste containing a reduced amount of sweetening agent and in addition plant sterol ester and/or plant stanol ester. Also fruit and vegetable juices and nectars are mentioned as suitable beverages according to the invention. On page 15 lines 1-7 the method of preparing the beverages is disclosed by referring to the method of adding triglycerides to beverages. This is done by homogenising the beverage as also disclosed in Examples 1-3 of the publication.

WO 2007/016630 discloses a beverage comprising an aqueous medium and sterol ester or stanol ester, and a method for preparing the beverage. Also this method includes homogenisation of the final product.

WO 2003/105611 discloses a process for producing aqueous compositions, such as beverages, containing nonesterified plant sterols. This method also includes homogenisation and the beverage does not contain any unhomogenised fruit and/or vegetable.

US 2005/0175672 discloses a particulate plant sterol composition and its use in food products and beverages. Example 9 shows fruit pulp, water and the sterol composition was pre-mixed with high shear (10000 rpm) and then homogenised (4500/500 psi) to obtain a beverage.

US 2002/0064548 discloses a method for dispersing plant sterol in beverages such as water, a juice beverage, a carbonated drink, milk and soya milk. This is done by melting the sterol and an emulsifier and admixing the molten mixture to an aqueous beverage, stirring at high speed 6800-7000 rpm for 10 min and then homogenising (e.g. Microfluidizer M110EHI) the final beverage.

DE 10063288 discloses beverages containing plant sterol. In the disclosure an emulsifier is added to orange nectar which is then heated. Plant sterol is added to heated oil to dissolve the plant sterol. The two mixtures are then mixed and homogenised in a dispersing apparatus to produce the beverage.

SUMMARY OF THE INVENTION

The present invention relates to a stable vegetable and/or fruit based beverage containing plant sterol esters and/or plant stanol esters and a method for preparing the beverage.

The beverage according to the invention has a smooth taste and provides a convenient way of ingesting vegetables and fruits in compact form simultaneously as the beverage provides a cholesterol-lowering amount of plant sterol esters and/or plant stanol esters. The beverage has a natural "fruity" mouthfeel due to the unhomogenised vegetable puree, fruit puree and/or fruit pulp it contains.

The beverage may further contain e.g. green tea extracts rich in catechins, aloe vera juice, agave nectar, ginseng, added vitamins and/or added minerals as health promoting ingredients.

DEFINITIONS

"Beverage" refers to a ready-to-drink beverage containing at least one texture component as defined below. The beverage may further contain fruit and/or vegetable material in the form of fruit juice and/or vegetable juice as well as in the form of homogenised vegetable puree, fruit puree and/or fruit pulp.

In this specification "texture component" refers to unhomogenised vegetable puree, unhomogenised fruit puree and/or unhomogenised fruit pulp where the texture of the vegetable puree, fruit puree and/or fruit pulp is retained in the beverage.

By the expression "aqueous emulsion containing plant sterol ester and/or plant stanol ester" is here meant the emulsion formed by homogenising plant sterol ester and/or plant stanol ester in an aqueous medium. Preferably also emulsifier is added.

"Juice" is the liquid naturally contained in vegetable or fruit tissue. Juices may be supplied in the form of concentrates, which subsequently can be diluted to their natural or wanted strength by addition of water.

"Pulp" is the soft fleshy part of a fruit.

"Puree" refers to vegetables or fruits that have been ground or pressed to the consistency of a soft paste. Almost always the vegetables have been treated by heat e.g. cooked before the size reduction of the material. Also the fruits used for the preparation of fruit puree may be heat-treated.

By the term "vegetable material" is meant all material obtained from vegetables i.e. vegetable juice and/or vegetable puree. By "homogenised vegetable material" is meant any of the vegetable materials that has been homogenised with the plant sterol ester and/or plant stanol ester to form an emulsion, which is used in the preparation of the beverage. This term may also include vegetable material that has been homogenised as such. The term "homogenised vegetable material" therefore excludes the texture component made of vegetables as well as into the texture component optionally mixed vegetable juice.

In the corresponding way the term "fruit material" means all material obtained from fruits i.e. fruit juice, fruit puree and/or fruit pulp. By "homogenised fruit material" is meant any of the fruit materials that has been homogenised with the plant sterol ester and/or plant stanol ester to form an emulsion, which is used in the preparation of the beverage. This term may also include vegetable material that has been homogenised as such. The term "homogenised fruit material" therefore excludes the texture component made of fruits as well as into the texture component optionally mixed fruit juice.

For clarity, by the expression "homogenised vegetable material and/or fruit material" is meant homogenised vegetable material and/or homogenised fruit material. The corresponding language is used also for other components, as well as for unhomogenised material. If there are three or more possible components listed like in the expression "homogenised A, B and/or C" this means homogenised A, homogenised B, homogenised C or a mixture of two or more of them.

By the term "improved stability" is here meant that the beverage is more stable compared to corresponding beverage without added plant sterol ester and/or plant stanol ester. Preferably the beverage remains as it is when just produced without any phase separation of the plant sterol ester and/or plant stanol ester and without any substantial separation of the puree and/or pulp material to the bottom or to the surface of the beverage during the shelf time of the beverage e.g. for two weeks. The improvement can therefore be seen as less sedimentation as a function of storage time, and preferably no sedimentation can be found after two weeks storage i.e. the beverage is stable.

By "mixing" is in this specification meant gentle mixing, typically from 50 to 500 rpm. During mixing the particle size is not practically reduced whereas the aim of homogenisation is particle size reduction. During the homogenisation the droplet size of the plant sterol ester and/or plant stanol ester is reduced and if vegetable puree, fruit puree and/or fruit pulp is present the particles thereof will be reduced practically to a size less than 100 μm.

Vegetable juice and/or puree can be used as a basic raw-material for the beverage. Non-exclusive examples of vegetables that can be used for producing the vegetable juice or puree are carrot, tomato, maize, celery, beets, parsley, cabbage, lettuce, spinach, cucumber, wheat grasspea, pumpkin, sauerkraut and mixtures of two or more of these.

Alternatively to, or preferably in addition to the vegetable juice and/or puree suitable fruit juices, pulps and/or purees can be used in the beverage. Non-exclusive examples of fruits (here also including berries) that can be used for producing the juice, pulp or puree are orange, apple, pomegranate, go goji, grapefruit, lemon, lime, pineapple, mango, banana, peach, grape, pear, kiwi, cherry, acerola, watermelon, cantaloupe, strawberry, raspberry, cranberry, blueberry, blackcurrant, plum, papaya, guava and mixtures of two or more of these.

As used here, the term "sterol ester and/or stanol ester" refers to plant sterols and/or plant stanols having at least 60%, preferably at least 85%, most preferably at least 95% of the sterols and/or stanols in esterified form.

In this specification the term "sterol" includes 4-desmethyl sterols, 4-monomethyl sterols and the term "stanol" include 4-desmethyl stanols, 4-monomethyl stanols. Typical 4-desmethyl sterols are sitosterol, campesterol, stigmasterol, brassicasterol, 22-dehydro-brassicasterol and δ5-avenasterol. Typical stanols are sitostanol, campestanol and their 24-epimers. The term "sterol and/or stanol" includes all possible mixtures of named sterols and/or stanols as well as any individual sterol or stanol.

In this invention the sterols and/or stanols are esterified with a carboxylic acid or a mixture of carboxylic acids and are then called "sterol ester". Examples of suitable carboxylic acids are fatty acids (2-24 carbon atoms, preferably 12-20 carbon atoms, saturated, monounsaturated or polyunsaturated, including also special fatty acids, such as conjugated fatty acids, e.g. CLA, and EPA and DHA), di- and tricarboxylic acids and hydroxy acids, and any mixture of said acids. Preferably the sterols and/or stanols are esterified with fatty acids, most preferably with vegetable oil based fatty acids.

Stanol fatty acid ester and the effects thereof, as well as a suitable method for its preparation, are disclosed in U.S. Pat. No. 6,174,560. Obviously sterol esters can efficiently be produced by the same method. Alternatively fatty acid esters of sterols and/or stanols can be produced by any method disclosed in the prior art.

Green tea extracts can be obtained from commercial sources such as HerbaSway Laboratories and Danisco. Preferably catechin-rich green tea extracts are used. A green tea extract with a standardised content of epigallocatechin (EGGG) is the most preferred green tea extract to be used in the vegetable and/or fruit based beverage according to the invention.

With the term "emulsifier" is here meant any suitable emulsifier and preferably a compound having a hydrophile-lipophile balance (HLB) value of at least 5. More preferably the emulsifier has a HLB value of at most 15, most preferably at most 13. Representative emulsifiers according to this invention are citric acid ester of mono- and diglycerides, lactic acid ester of mono- and diglycerides, diacetyltartaric acid ester of mono- and diglycerides, sodium stearoyl lactylate, calsium stearoyl lactylate, sucrose fatty acid esters, and polyoxyethylene sorbitan monolaurate or mixtures thereof. The most preferred emulsifier is citric acid ester of mono- and diglycerides, lactic acid ester of mono- and diglycerides, diacetyltartaric acid ester of mono- and diglycerides and mixtures thereof.

DETAILED DESCRIPTION OF THE INVENTION

Dietary recommendations in most Western-world countries promote an intake of 5-6 servings of fruits and vegetables. Consuming fruits and vegetables as well as food products and beverages containing them is highly recommended by dietary guidelines in most countries. A convenient way to consume fruits and vegetables is to consume them in reduced form as drinkable beverages. However, the amount of vegetables in such beverages is limited due to the astringent acid taste and rough or harsh texture which are typical for vegetable beverages.

It is known that when adding plant sterol ester and/or plant stanol ester to a beverage a homogenisation step is needed to make a homogenous and stable product. It is also known that homogenisation and adding of clouding agents change the original texture of vegetable beverages in a way that they become smoother and they loose the puree type of texture.

It has now been found that homogenisation of a beverage containing both plant sterol ester and/or plant stanol ester and vegetable puree, fruit puree and/or fruit pulp is not needed to get an evenly dispersed beverage with improved stability and the beverage according to the invention is preferably a stable beverage containing both plant sterol ester and/or plant stanol ester and vegetable puree, fruit puree and/or fruit pulp. Additionally the taste of the beverage is improved. The plant sterol ester and/or plant stanol ester addition gives a smooth mouthfeel and a less astringent acid taste, but does not change the puree type of character of the product. However, it improves the stability of the beverage.

Sugar is most often used to mask undesired taste, especially acidity, but also bitter and astringent taste. In beverages according to the invention it is possible to improve the nutritional properties by reducing the amount of sugar. A further benefit with the invention is that it is possible to reduce the amount of fruit material e.g. fruit juice(s) and instead increase the amount of vegetable material e.g. vegetable juice(s) and in this way reduce the energy content of the product. Preferably the amount of vegetable material is at least 10% by weight of the total amount of vegetable and fruit material in the beverage.

Thus, in a first aspect of the present invention there is provided a method for preparing a beverage with improved stability comprising at least one texture component selected from the group consisting of unhomogenised vegetable puree, fruit pulp and fruit puree, optionally unhomogenised vegetable juice and/or fruit juice, optionally homogenised vegetable material and/or fruit material, and a plant sterol ester and/or plant stanol ester in an amount of from 0.2 to 25% by weight of the beverage, said method comprising mixing an aqueous emulsion containing plant sterol ester and/or plant stanol ester with at least one texture component selected from the group consisting of unhomogenised vegetable puree, fruit pulp and fruit puree to produce the beverage.

As the texture component, i.e. vegetable puree, fruit puree and/or fruit pulp is not subjected to homogenisation, the texture of the vegetable puree, fruit puree and/or fruit pulp is retained in the beverage. Thus, the beverage contains particles of the size from 100 μm to 3000 μm. The plant sterol ester and/or plant stanol ester forms much smaller particles, typically below 10 μm, and the beverage may contain also other small particles below 100 μm arising from e.g. fruit and/or vegetable material including e.g. juices and, if present, homogenised vegetable puree, fruit puree and/or fruit pulp. The beverage may also contain some bigger particles than 3000 μm, e.g. from orange pulp. If the beverage though contains particles between 100 μm and 3000 μm it can be concluded it contains the texture component according to the invention.

According to the invention the aqueous emulsion containing plant sterol ester and/or plant stanol ester mixed with said texture component can additionally be mixed with vegetable material and/or fruit material in the form of a juice to produce the beverage.

Alternatively, according to the invention said texture component can first be mixed with vegetable material and/or fruit material in the form of a juice, subsequently mixing thus obtained mixture with the aqueous emulsion containing plant sterol ester and/or plant stanol ester to produce the beverage. Further, the aqueous emulsion containing plant sterol ester and/or plant stanol ester mixed with the mixture of said texture component and vegetable material and/or fruit material in the form of a juice can additionally be mixed with further vegetable material and/or fruit material in the form of a juice to produce the beverage.

Preferably the aqueous emulsion is prepared by forming an aqueous mixture comprising an aqueous medium, the plant sterol ester and/or plant stanol ester and an emulsifier and homogenising the mixture.

In a preferred embodiment of the invention the plant sterol ester and/or plant stanol ester is heated to a temperature between 30 and 90° C. where the plant sterol ester and/or plant stanol ester is in liquid state and mixed with the emulsifier to form a mixture, and the mixture is mixed with the aqueous medium heated to a temperature between 30° C. and 90° C. to form the aqueous mixture and the aqueous mixture is homogenised.

Said aqueous medium can consist essentially (i.e. at least 95% by weight) of water or said aqueous medium can comprise water and fruit material and/or vegetable material preferably in the form of a juice.

Said aqueous emulsion may alternatively be prepared by forming an aqueous mixture comprising an aqueous medium containing protein and the plant sterol ester and/or plant stanol ester and homogenising the mixture. Thus, said aqueous medium containing protein comprises typically at least 80% by weight of water. The dry substance of the aqueous medium may include protein, such as milk protein or soy protein, which means that the aqueous medium may be or may contain milk, whey, yoghurt, soymilk or a yoghurt-like soy product. The water content of an aqueous medium containing protein is preferably from 80% by weight to less than 95% by weight. When the aqueous medium contains protein the addition of emulsifier to form the aqueous emulsion is not necessary. Preferably though, the aqueous medium consists essentially i.e. at least 95% by weight of water or comprises fruit material and/or vegetable material preferably in the form of juice(s) and without any protein from milk and/or soy.

In a second aspect of the invention there is provided a beverage with improved stability comprising at least one texture component selected from the group consisting of unhomogenised vegetable puree, fruit pulp and fruit puree, optionally unhomogenised vegetable juice and/or fruit juice, optionally homogenised vegetable material and/or fruit material, and a plant sterol ester and/or plant stanol ester in an amount of from 0.2 to 25% by weight of the beverage. Preferably the beverage is stable for two weeks at +4° C. storage.

The amount of the texture component can be from 10 to 100% by weight, preferably from 30 to 98% by weight and most preferably from 50 to 95% by weight of the total amount of vegetable material and fruit material.

The amount of the texture component can be from 15 to 80% by weight, preferably from 20 to 60% by weight, and most preferably from 25 to 50% by weight of the beverage.

The amount of vegetable material can be from 0 to 100% by weight, preferably from 2 to 100% by weight, more preferably from 5 to 100% by weight, still more preferably from 10 to 100% by weight, even more preferably from 20 to 90% by weight, still even more preferably from 30 to 85% by weight, further more preferably from 40 to 80% by weight, and most preferably from 45 to 75% by weight of the total amount of the vegetable material and the fruit material.

The amount of fruit material can be from 0 to 100% by weight, preferably from 0 to 98% by weight, more preferably from 0 to 95% by weight, still more preferably from 0 to 90% by weight, even more preferably from 10 to 80% by weight, still even more preferably from 15 to 70% by weight, further more preferably from 20 to 60% by weight, and most preferably from 25 to 55% by weight of the total amount of the vegetable material and the fruit material.

The amount of the plant sterol ester and/or plant stanol ester can be from 1.4 to 7.5% by weight, preferably from 1.4 to 6.8% by weight, more preferably from 1.4 to 5.2% by weight, and most preferably from 1.4 to 4.8% by weight of the beverage.

The beverage may additionally contain an emulsifier, the amount thereof preferably being from 1 to 10% by weight of the plant sterol ester and/or plant stanol ester.

Vegetables which can be used in the present invention include carrot, tomato, maize, celery, beets, parsley, cabbage, lettuce, spinach, cucumber, wheat grasspea, pumpkin, sauerkraut and mixtures of two or more of these.

Fruits which can be used in the present invention include orange, apple, pomegranate, go goji, grapefruit, lemon, lime, pineapple, mango, banana, peach, grape, pear, kiwi, cherry, acerola, watermelon, cantaloupe, strawberry, raspberry, cranberry, blueberry, blackcurrant, plum, papaya, guava and mixtures of two or more of these. Juices from pomegranate and goji berry are especially beneficial.

The beverage may additionally contain green tee extract, aloe vera juice, agave nectar, ginseng, added vitamins, added minerals or a mixture of two or more of these.

The viscosity of the beverage is preferably in the range from 500 to 2000 mPas, more preferably from 600 to 1700 mPas and most preferably from 700 to 1500 mPas, measured at 20° C. using Brookfield model LVDV II, spindle no 4.

In addition, the present invention provides a beverage with a combination of healthy ingredients. In one embodiment the invention provides means for delivering vegetable and/or fruits corresponding to 1-2 servings of vegetables and/or fruits and a daily effective amount of plant sterol ester and/or plant stanol ester for effective lowering of serum cholesterol levels. The beverage can provide the daily needed effective amount of plant sterol ester and/or plant stanol ester in 1-3 servings, preferably in one serving of a 50-350 ml, more preferably 50-200 ml beverage, most preferably in a serving of 100 ml or 150 ml.

In another embodiment the invention provides means for delivering vegetable and/or fruits corresponding to 1-2 servings of vegetables and/or fruits in a vegetable and/or fruit based beverage and further delivering a daily effective amount of plant sterol ester and/or plant stanol ester for effective lowering of serum cholesterol levels and a catechin-rich green tee extract in one serving of 100-250 ml beverage, preferably of 150-250 ml. The green tea extract contains green tea catechins from 50-500 mg, preferably 100-300 mg, most preferably 150-250 mg per daily dose of the beverage, being preferably one 100-250 ml package. Such a beverage with added green tea extract can optionally further contain aloe vera juice, agave nectar, ginseng, added vitamins and/or added minerals.

The beverage according to the present invention can be prepared in the following way. Plant sterol ester and/or plant stanol ester is melted at 30-90° C., preferably 30-70° C., and optionally mixed with an emulsifier with a blender to form a melted mixture of sterol ester and/or stanol ester and emulsifier. This is mixed using an efficient blender with an aqueous phase or medium, which contains water or water and fruit material and/or vegetable material preferably in the form of a juice. The aqueous medium may also be protein-based and comprise e.g. milk, whey, yoghurt, soymilk or a yoghurt-like soy product. The mixture of the aqueous phase and the sterol ester and/or stanol ester phase is homogenised at a pressure from 50 to 500 bar, most typically from 150 to 350 bar to form an emulsion. The emulsion is optionally heat-treated by pasteurisation or UHT-treatment. This treatment of the aqueous emulsion is necessary if the rest of the preparation process is performed aseptically using pasteurised raw-materials. The homogenised and optionally heat-treated emulsion is then cooled. The cooled emulsion is then uniformly mixed with the texturing component, which is vegetable puree, fruit pulp and/or fruit puree, with a mixer using typically from 50 to 500 rpm. Also part of the juice(s) may be added at this stage or be mixed with the puree and/or pulp before mixing it with the emulsion. If this texture component is not pasteurised or it is added in a non-aseptic way to the emulsion the final beverage should be heat-treated to ensure the needed shelf time of the beverage. Water and/or juice(s) may be added at any convenient stage to any convenient component during the preparation of the beverage. The other health promoting ingredients can be added either to the aqueous phase before the emulsification, to the formed emulsion or to the final beverage. The beverage according to the invention may also further include a thickener such as pectin or gums. The plant sterol ester and/or plant stanol ester content of the ready-to-drink product is preferably from 1.4 to 7.5% and more preferably from 1.4 to 6.8% by weight. The viscosity of the ready-to-drink product is from 500 to 2000 mPas measured at 20° C. by Brookfield Model LVDV II, spindle no 4.

The following examples are presented to further illustrate the present invention. All percentages referred to in this specification are given as weight-%, if not otherwise specified.

Example 1

34 g of melted plant stanol fatty acid ester wherein the fatty acid portion is derived from rapeseed oil (Benecol Classic, Raisio Nutrition Ltd.) and 1.0 g of the citric acid ester of mono- and diglycerides (Danisco) was mixed at 60° C. Separately a water phase containing 50 g of apple juice concentrate, 25 g of pear juice concentrate and 25 g of carrot juice concentrate and 365 g of water was heated to 60° C. The mixture of stanol ester and emulsifier was mixed at 450 rpm with the water phase and homogenised (APV homogeniser Model 1000) in two stages at 250/50 bar. The emulsion was cooled to 20° C. The viscosity of the emulsion was 50 mPas measured with Brookfield Model LVDV II, spindle 4.

A texturing component was made by mixing 250 g of carrot puree, 150 g of maize puree and 100 g of orange pulp (all produced by Rudolf Wild GmbH). No sugar was added. The emulsion containing plant stanol ester and the texture component were mixed at 200 rpm, packed in 100 ml bottles and cooled. The viscosity of the ready-to-drink vegetable based beverage was 540 mPas measured with Brookfield Model LVDV II, spindle no 4 at 20° C. and the pH was 4.1. The beverage was homogenous and no creaming was detected after two weeks of storage at 4° C. The mouthfeel was smooth and acidity acceptable.

Example 2

453 g of melted plant stanol fatty acid ester (as in Example 1) and 6.8 g of diacetyl-tartaric acid ester of mono- and diglycerides (Danisco) and 6.8 g of citric acid ester of mono- and diglycerides were mixed at 60° C. 6.7 liters of water was heated to 60° C. The mixture of stanol ester and emulsifiers was mixed with the water by a blender (450 rpm) and homogenised in two stages at 250/50 bar and processed with UHT (4 sec, at 144° C., Alfa-Laval Sterilab).

A texture component was made by mixing 4.4 kg of carrot puree, 3.2 kg of tomato puree, 2.2 kg banana puree, 1.2 kg of orange pulp and 0.8 kg apple puree and to this was further added 0.5 kg orange juice, 0.5 kg pumpkin juice and 0.02 kg lemon juice (all produced by Rudolf Wild GmbH) at 20° C. The emulsion containing stanol ester and the texture component in the juices were mixed at 50 rpm and packed in 150 ml bottles and cooled to 20° C. The viscosity of the ready-to-drink vegetable based beverage was 624 mPas measured with Brookfield Model LVDV II, spindle no 4 at 20° C.

The same product without plant stanol ester addition was made by mixing 6.7 liters of water (sterilised by boiling and cooling to 20° C.) and 12.8 kg of the above mentioned texture component in juices.

The stability of the products was evaluated after 2 weeks at 20° C. and no separation of pulp or puree, or creaming of the vegetable beverage containing stanol ester was detected. The taste was smooth. Somewhat separation of pulp of the product without plant stanol ester was detected. After shaking also this beverage was evenly dispersed for a short time. The mouthfeel of the products were detected to be close to each other. The acidity of the product containing plant stanol ester was evaluated to be less than without plant stanol ester.

Example 3

680 g of melted plant stanol fatty acid ester (as in Example 1) and 13.6 g of diacetyl-tartaric acid ester of mono- and diglycerides and 13.6 g of citric acid ester of mono- and diglycerides were mixed at 60° C. 100 g of GUARDIAN™ Green Tea Extract 20S (Danisco) containing 20% catechins was dissolved into 6.7 liters of water and heated to 60° C. The mixture of plant stanol ester and emulsifiers was mixed with the water containing green tea extract and homogenised at 250/50 bar and processed with UHT (4 sec, at 144° C., Alfa-Laval Sterilab).

A texture component was made by mixing 4.4 kg of carrot puree, 3.2 kg of tomato puree, 2.2 kg banana puree, 1.2 kg of orange pulp and 0.8 kg apple puree, and to this was further added 0.68 kg orange juice and 0.02 kg lemon juice (all produced by Rudolf Wild GmbH). No sugar was added. The emulsion containing plant stanol ester and the texture component in the juices were mixed at 50 rpm and packed in 100 ml bottles and cooled to 20° C.

The stability of the products was evaluated after 2 weeks at 20° C. and no separation of pulp or puree, or creaming of the beverage was detected. The taste was smooth and compared to the product of Example 2 the green tea concentrate did not negatively impact on the taste of the beverage.

Example 4

The same product as described in Example 1 was produced but in addition 15 g of Aloe Vera 10× Liquid Concentrate (Garuda International Inc.) was added to the texture component. A 100 ml portion of vegetable based beverage contained 3.3 g plant stanol ester and 1.5 g aloe vera. The obtained product had a slightly smoother mouthfeel as compared to the beverage of Example 1.

Example 5

290 g carrot juice concentrate
250 g apple juice concentrate
30 g strawberry juice concentrate
2 g citrus juice concentrate
310 g apple puree
20 g orange pulp
20 g strawberry puree
25 g acerola puree concentrate
35 g plant sterol fatty acid ester
1 g citric acid ester of mono- and diglycerides The plant sterol fatty acid ester and the emulsifier were treated as in Example 1. The mixture was mixed and homogenised with the apple and carrot juices to form the aqueous emulsion as in Example 1. The rest of the juices were added to the pulps and purees and this mixture was mixed with the aqueous emulsion at 250 rpm to obtain the final beverage.

The invention claimed is:

1. A method for preparing a beverage with improved stability comprising at least one texture component selected from the group consisting of unhomogenised vegetable puree, unhomogenised fruit pulp and unhomogenised fruit puree; optionally unhomogenised vegetable juice and/or fruit juice; optionally homogenised vegetable material and/or fruit material; and a plant sterol ester and/or plant stanol ester in an amount of from 0.2 to 25% by weight of the beverage, said method comprising:
    mixing an aqueous emulsion containing plant sterol ester and/or plant stanol ester with at least one texture component selected from the group consisting of unhomogenised vegetable puree, unhomogenised fruit pulp and unhomogenised fruit puree to produce the beverage;
    wherein the step of mixing does not substantially reduce the particle size of ingredients of the beverage.

2. The method of claim 1 wherein said aqueous emulsion containing plant sterol ester and/or plant stanol ester is mixed with said texture component and additionally mixed with vegetable material and/or fruit material in the form of a juice to produce the beverage.

3. The method of claim 1 wherein said texture component is first mixed with vegetable material and/or fruit material in the form of a juice, and subsequently thus obtained mixture is mixed with said aqueous emulsion containing plant sterol ester and/or plant stanol ester to produce the beverage.

4. The method of claim 1 wherein the aqueous emulsion is prepared by forming an aqueous mixture comprising an aqueous medium, the plant sterol ester and/or plant stanol ester and an emulsifier and homogenising the mixture.

5. The method of claim 4 wherein the plant sterol ester and/or plant stanol ester is heated to a temperature between 30° C. and 90° C. where the plant sterol ester and/or plant stanol ester is in liquid state and mixed with the emulsifier to form a mixture, and the mixture is mixed with the aqueous medium heated to a temperature between 30 and 90° C. to form the aqueous mixture and the aqueous mixture is homogenised.

6. The method of claim 4 wherein the aqueous medium consists essentially of water.

7. The method of claim 4 wherein the aqueous medium comprises water and fruit material and/or vegetable material in the form of a juice.

8. The method of claim 1 wherein the aqueous emulsion is prepared by forming an aqueous mixture comprising an aqueous medium containing protein and the plant sterol ester and/or plant stanol ester and homogenising the mixture.

9. The method of claim 1 wherein the vegetable comprises carrot, tomato, maize, celery, beets, parsley, cabbage, lettuce, spinach, cucumber, wheat grasspea, pumpkin, sauerkraut or a mixture of two or more of these.

10. The method of claim 1 wherein the fruit comprises orange, apple, pomegranate, go goji, grapefruit, lemon, lime, pineapple, mango, banana, peach, grape, pear, kiwi, cherry, acerola, watermelon, cantaloupe, strawberry, raspberry, cranberry, blueberry, blackcurrant, plum, papaya, guava or a mixture of two or more of these.

11. A beverage with improved stability obtained by a method of claim 1.

12. A beverage with improved stability comprising:
at least one texture component selected from the group consisting of unhomogenised vegetable puree, unhomogenised fruit pulp and unhomogenised fruit puree;
optionally unhomogenised vegetable juice and/or fruit juice;
optionally homogenised vegetable material and/or fruit material; and
a plant sterol ester and/or plant stanol ester in an amount of from 0.2 to 25% by weight of the beverage.

13. The beverage of claim 11 wherein the amount of the texture component is from 10 to 100% by weight of the total amount of vegetable material and fruit material.

14. The beverage of claim 11 wherein the amount of the texture component is from 15 to 80% by of the beverage.

15. The beverage of claim 11 wherein the amount of vegetable material is from 0 to 100% by weight of the total amount of the vegetable material and the fruit material.

16. The beverage of claim 11 wherein the amount of fruit material is from 0 to 100% by weight of the total amount of the vegetable material and the fruit material.

17. The beverage of claim 11 wherein the amount of the plant sterol ester and/or plant stanol ester is from 1.4 to 7.5% by weight of the beverage.

18. The beverage of claim 11 wherein the beverage additionally comprises an emulsifier, the amount thereof being from 1 to 10% by weight of the plant sterol ester and/or plant stanol ester.

19. The beverage of claim 11 wherein the beverage additionally comprises a protein.

20. The beverage of claim 11 wherein the vegetable comprises carrot, tomato, maize, celery, beets, parsley, cabbage, lettuce, spinach, cucumber, wheat grasspea, pumpkin, sauerkraut or a mixture of two or more of these.

21. The beverage of claim 11 wherein the fruit comprises orange, apple, pomegranate, go goji, grapefruit, lemon, lime, pineapple, mango, banana, peach, grape, pear, kiwi, cherry, acerola, watermelon, cantaloupe, strawberry, raspberry, cranberry, blueberry, blackcurrant, plum, papaya, guava or a mixture of two or more of these.

22. The beverage of claim 11 wherein the beverage additionally comprises green tea extract, aloe vera juice, agave nectar, ginseng, added vitamins, added minerals or a mixture of two or more of these.

23. The beverage of claim 11 wherein the viscosity of the beverage is in the range from 500 to 2000 mPas.

* * * * *